US010164957B1

(12) United States Patent
Saylor et al.

(10) Patent No.: US 10,164,957 B1
(45) Date of Patent: Dec. 25, 2018

(54) CONDITIONAL USER CREDENTIALS

(71) Applicant: MicroStrategy Incorporated, Vienna, VA (US)

(72) Inventors: Michael J. Saylor, Vienna, VA (US); Hector Vazquez, Ashburn, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 1261 days.

(21) Appl. No.: 13/859,862

(22) Filed: Apr. 10, 2013

Related U.S. Application Data

(60) Provisional application No. 61/731,871, filed on Nov. 30, 2012.

(51) Int. Cl.
*H04L 29/06* (2006.01)
(52) U.S. Cl.
CPC .................................... *H04L 63/08* (2013.01)
(58) Field of Classification Search
CPC ................................ H04L 63/08; H04L 29/06
USPC ........... 713/182–186, 202, 68–174; 709/206, 709/225, 229, 249, 389; 726/2–8
See application file for complete search history.

(56) References Cited

U.S. PATENT DOCUMENTS

| | | |
|---|---|---|
| 8,234,220 B2 | 7/2012 | Weiss |
| 8,613,052 B2 | 12/2013 | Weiss |
| 2010/0082491 A1 | 4/2010 | Rosenblatt et al. |
| 2011/0252464 A1* | 10/2011 | Sanjeev ................ H04L 63/107 726/7 |
| 2012/0030736 A1* | 2/2012 | Resch ................... H04L 1/0045 726/5 |
| 2012/0151206 A1* | 6/2012 | Paris ..................... H04L 9/3234 713/155 |

OTHER PUBLICATIONS

'Rail Industry Meetings' [online]. "Masabi and MBTA to launch first smartphone rail ticketing system in the US," Mar. 2012, [Retrieved on Jun. 14, 2012]. Retrieved from the Internet: <URL: http://www.abe-industry.com/railim/index.php/en/newsflash/788-masabi-and-mbta-to-launch-first-smartphone-rail-ticketing-system-in-the-us.html>. 2 pages.

"Transport Operators and Barcode M-Ticketing: Expand station sales capacity without spending more on staff and ticket machines," Masabi, London, UK, publicly available before Jun. 10, 2013, 2 pages.

(Continued)

*Primary Examiner* — Evans Desrosiers
(74) *Attorney, Agent, or Firm* — Fish & Richardson P.C.

(57) ABSTRACT

In one implementation, a processing system receives a request from a user to output a representation for a credential at a client device, the credential being associated with the user. In response to receiving the request from the user to output the representation for the credential, the processing system accesses data identifying one or more conditions associated with the credential. The processing system then determines that at least one of the one or more conditions associated with the credential is not satisfied. And then, in response to determining that the at least one of the one or more conditions associated with the credential is not satisfied, the processing system denies the request from the user to output the representation for the credential at the client device.

23 Claims, 7 Drawing Sheets

(56) References Cited

OTHER PUBLICATIONS

Ray, B. "Apple Passbook card-'e'-ticket app paves way for iOS e-wallet," The Register, Jun. 12, 2012, [Retrieved on Jun. 14, 2012]. Retrieved from the Internet: <URL: http://www.theregister.co.uk/2012/06/12/apple_passbook/>. 3 pages.

Rooney, B. "Masabi Launches U.S.'s First Ticketless Rail System," The Wall Street Journal, Apr. 2012, [Retrieved on Jun. 14, 2012]. Retrieved from the Internet: <URL: http://blogs.wsj.com/tech-europe/2012/04/23/masabi-launches-u-s-s-first-ticketless-rail-system/>. 3 pages.

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

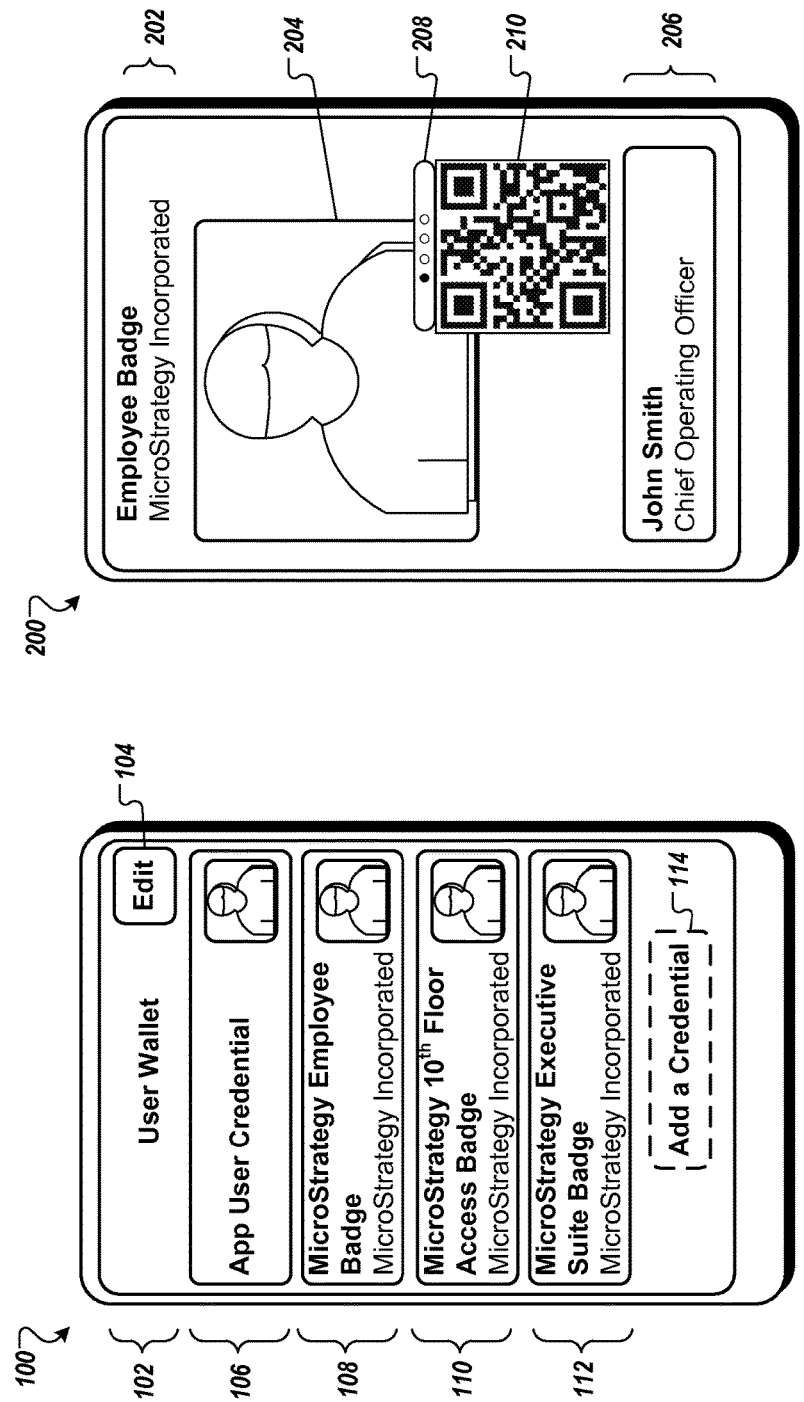

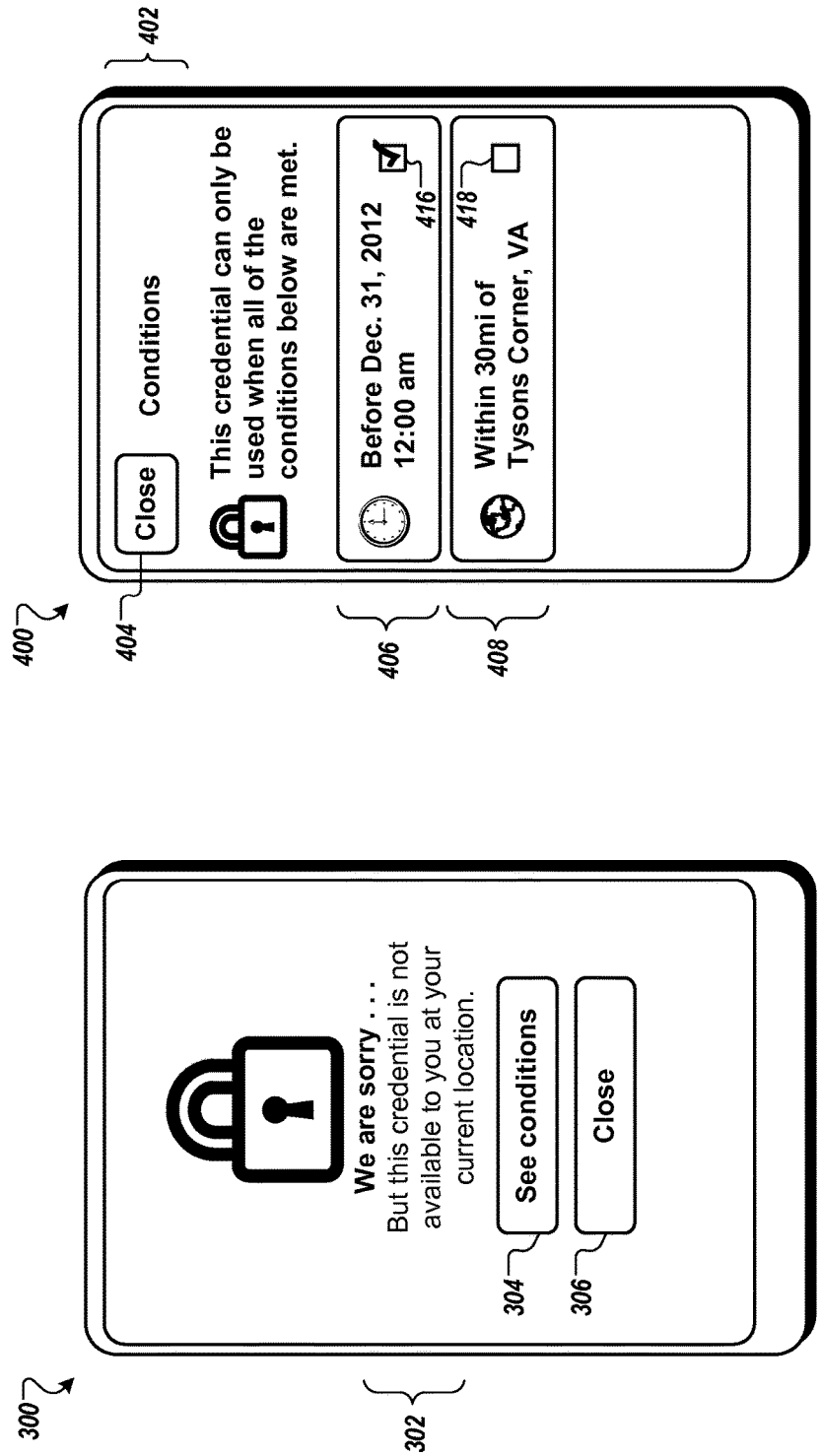

CONDITIONAL USER CREDENTIALS

CROSS-REFERENCE TO RELATED APPLICATION

This application claims the benefit to U.S. Provisional Application Ser. No. 61/731,871, filed on Nov. 30, 2012, and titled CONDITIONAL USER CREDENTIALS. This application is incorporated by reference herein in its entirety.

TECHNICAL FIELD

This specification generally relates to user credentials.

BACKGROUND

A person may be associated with a credential that, for example, permits the person to access locations and/or events.

SUMMARY

In general, one aspect of the subject matter described in this specification may include the actions of receiving a request from a user to output a representation for a credential at a client device, the credential being associated with the user. Next, in response to receiving the request from the user to output the representation for the credential, the actions include accessing data identifying one or more conditions associated with the credential. Then, the actions include determining that at least one of the one or more conditions associated with the credential is not satisfied. Finally, in response to determining that the at least one of the one or more conditions associated with the credential is not satisfied, the actions include denying the request from the user to output the representation for the credential at the client device. Denying the request may include outputting a message to the user indicating that at least one of the one or more conditions is not satisfied, and preventing a representation for the credential from being outputted at the client device.

In some implementations, one or more conditions associated with a credential may be temporal conditions that identify a period of time during which a credential is valid. In such implementations, determining that at least one of the one or more conditions associated with the credential is not satisfied comprises determining that a current time is not within the period of time during which the credential is valid. The current time may be obtained, for example, from a server and/or a processing system operated by a validation entity.

In some implementations, one or more conditions associated with a credential may be geographic conditions that identify a geographic region at which a credential is valid. In such implementations, determining that at least one of the one or more conditions associated with the credential is not satisfied comprises determining that a current location is outside the geographic region at which the credential is valid.

In some implementations, the actions include determining that a current time is within a predetermined amount of time of an end of the period of time during which a credential is valid and outputting a message to the user indicating that the credential has expired or is about to expire. In some implementations, the actions include determining that a current location of the client device is within a predetermined distance of a boundary of the geographic region at which a credential is valid, and outputting a message to the user indicating that the user is about to leave or has left the geographic region at which the credential is valid.

In general, another aspect of the subject matter described in this specification may include the actions of receiving a request to validate a credential from a processing system, the request comprising a credential identifier that identifies a credential and determining that the credential identifier is associated with a valid credential. The actions may also include accessing data identifying one or more conditions associated with the credential using the credential identifier and determining that at least one of the one or more conditions associated with the credential is not satisfied. In response to determining that at least one of the one or more conditions associated with the credential is not satisfied, the actions further include transmitting, to a processing system operated by a validation entity, a response indicating that a condition associated with the credential is not satisfied, and transmitting, to a client device, a message indicating that a condition associated with the credential is not satisfied.

In some implementations, one or more conditions associated with a credential may be temporal conditions that identify a period of time during which a credential is valid. In such implementations, determining that at least one of the one or more conditions associated with the credential is not satisfied comprises determining that a current time is not within the period of time during which the credential is valid. The current time may be obtained, for example, from a server and/or a processing system operated by a validation entity.

In some implementations, one or more conditions associated with a credential may be geographic conditions that identify a geographic region at which a credential is valid. In such implementations, determining that at least one of the one or more conditions associated with the credential is not satisfied comprises determining that a current location is outside the geographic region at which the credential is valid. Further, in such implementations, the request to validate the credential includes a current location of a client device obtained using one or more of GPS coordinates, Wi-Fi access point triangulation data, cellular network triangulation data, or IP address information.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DESCRIPTION OF DRAWINGS

FIG. 1 is an illustration of an example of a user interface that enables a user to select from among various credentials.

FIG. 2 is an illustration of an example of a representation of a credential.

FIG. 3 is an illustration of an example of an alert to a user that a condition associated with a credential is not satisfied.

FIG. 4 is an illustration of examples of conditions associated with a credential.

DETAILED DESCRIPTION

Figure 5:
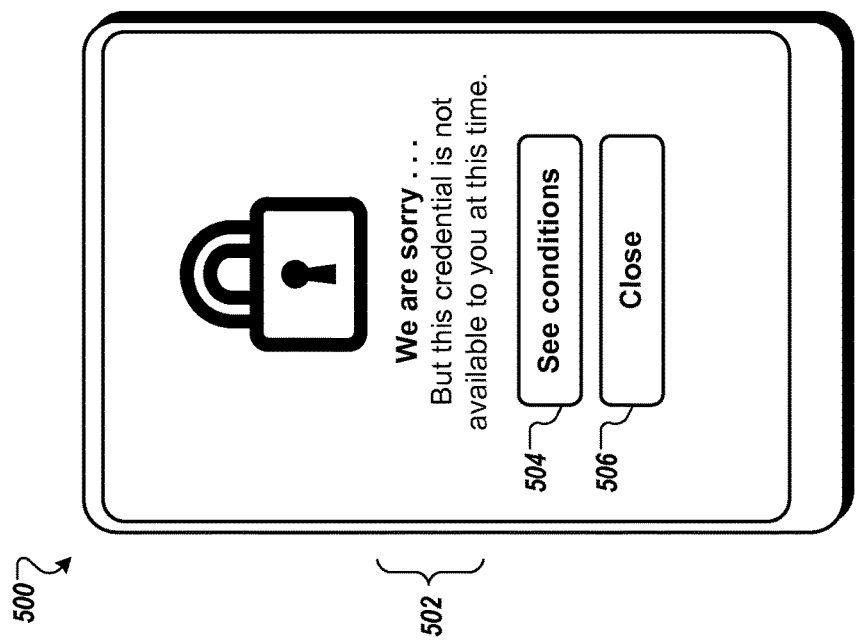
FIG. 5 is an illustration of another example of an alert to a user that a condition associated with a credential is not satisfied.

In some instances, representations of credentials for groups of users or for individuals are generated. The credentials can be, for example, identity credentials (driver's licenses, passports, visas, police badges etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Furthermore, conditions on the operability of the credentials may be applied to the credentials, for example, specific time and/or location conditions may be imposed on when and/or where the credential is valid. A time condition can be, for example, a specific date and time (e.g., Dec. 25, 2012 from 9:00 am to 5:00 pm), an expiration date and time (e.g., Before Dec. 31, 2012 at 12:00 am), or a recurring day and time (e.g., every Monday through Friday from 9:00 am to 5:00 pm). A location condition can identify, for example, a commercial building, a geographic region, a room, a large venue, a private residence, or any other physical space where the credential is valid.

Credentials can be maintained on and/or accessed from client devices (e.g., mobile computing devices like smart phones and tablet computers) and credentials can be represented in various forms as described below. For example, credentials can be represented by parametrically-generated graphical representations, animated graphical representations, phrases, numeric representations, and/or optical machine-readable representations. A server, or collection of servers, can manage and distribute credentials to appropriate users' client devices. A credential may be operational (e.g., capable of being displayed and/or validated) only if certain predefined conditions (e.g., date and/or time restrictions) are satisfied. The conditions may be enforced at the client device when the user attempts to present a credential, at the server when a validation entity attempts to validate the credential, or any suitable combination of both.

Techniques for distributing, managing, and validating conditional user credentials are described below. First, a general description of example implementations will be described. Then, more detailed implementations are described.

FIG. 1 shows an example user interface 100 that enables a user to select from among various credentials belonging to the user. In particular, the user interface 100 includes an example of a user's wallet (identified with a "User Wallet" caption 102) that provides the user with access to numerous different credentials associated with the user. For example, the user interface 100 includes an "App User Credential" 106, a "MicroStrategy Employee Badge" 108, a "MicroStrategy 10$^{th}$ Floor Access Badge" 110, and a "MicroStrategy Executive Suite Badge" 112. The user can select any one of these credentials from the user's wallet to output a representation of the credential from the user's client device. The user may make the selection, for example, by touching the corresponding area on a presence-sensitive display of the client device. The user can also select an Edit command button 104 to modify settings associated with the credentials, and can add a credential to the wallet by selecting command button 114.

FIG. 2 shows an example representation of a credential. For example, when a user selects the "MicroStrategy Employee Badge" 108 shown in FIG. 1, assuming that any conditions associated with the credential are satisfied, the selected badge 200 may be displayed on the client device as shown in FIG. 2. The badge 200 includes a caption 202 identifying it as an "Employee Badge" for "MicroStrategy Incorporated." Also included is an image of the user 204 and a caption 206 that identifies the associated user as "John Smith, Chief Operating Officer." The badge 200 further includes a swiping slider 208 that may enable a user to select between different representations for the credential. For example, in the current position, the slider 208 causes an optical-machine readable representation for the credential 210 (e.g., a quick response (QR) code) to be displayed.

FIG. 3 shows an example alert 300 to a user that a condition associated with a credential is not satisfied. For example, assume that the credential identified as the "Employee Badge" 108 had an associated location condition that was not satisfied at the time the user selected "Employee Badge" 108 in an effort to display a representation of "Employee Badge 108. Specifically, assume that the location condition requires the user's client device to be within 30 miles of Tyson's Corner, Va. for the "Employee Badge" 108 to be operational. If the user's client device was greater than 30 miles from Tyson's Corner, Va. when the user selects "MicroStrategy Employee Badge" 108, instead of showing the badge 200 of FIG. 2, the client device would display the alert 300 of FIG. 3. The alert 300 includes a caption 302 stating that "We are sorry . . . . But this credential is not available to you at your current location." The user can select the "See conditions" command button 304 to see the conditions associated with the credential, or the "Close" command button 306 to close the credential and return to the user interface 100.

FIG. 4 shows sample conditions associated with a credential. Assuming that the user selects command button 304, the client device would display all of the conditions associated with the "Employee Badge" 108 on user interface 400. For example, the user interface 400 shows that the "Employee Badge" 108 is associated with a time condition 406 (e.g., "Before Dec. 31, 2012, 12:00 am") and a location condition 408 (e.g., "Within 30 mi of Tysons Corner, Va."). In this example, the checked checkbox 416 indicates that the time condition 406 is satisfied. However, the unchecked checkbox 418 indicates that the location condition 408 is not satisfied as described in the alert 300. The user interface 400 also includes a "Close" command button 404 to return the user to the user wallet user interface 100. A caption 402 indicates that the screen displays "Conditions."

FIG. 5 shows another sample alert 500 to a user that a condition associated with a credential is not satisfied. For example, assume that the credential identified as the "Employee Badge" 108 had an associated time condition that was not satisfied. Specifically, assume that the time condition restricts the credential such that it is only operational before Dec. 31, 2012 at 12:00 am. If the current date and time at the client device is Jan. 30, 2013, 3:00 pm, then, when the user selects "MicroStrategy Employee Badge" 108, instead of showing the badge 200 of FIG. 2, the client device would display the alert 500 of FIG. 5. The alert 500 includes a caption 502 stating that "We are sorry . . . . But this credential is not available to you at this time." The user can select the "See conditions" command button 504 to see the conditions associated with the credential similar to the user interface 400 shown in FIG. 4. However, instead of the checkbox 416 being checked, if the time condition was not satisfied, the checkbox 416 of FIG. 4 would be unchecked. The alert 500 also includes a "Close" command button 506 to close the credential and return to the user interface 100.

In some implementations, if two or more conditions are not satisfied, the client device may show an alert for only one specific condition (e.g., only the alert for the first condition), may show an alert for each unsatisfied condition (e.g., showing each alert in series or all on the same screen), or may show a combined alert (e.g., showing a combined message). For example, if the location condition 406 and the time condition 408 were both not satisfied, the client device might display: (i) only the location alert 300, (ii) only the time alert 500, (iii) the location alert 300 first and then the time alert 500 second, (iv) both the location and time alerts 300, 500 simultaneously, or (v) a combined alert with a message such as "This credential is not available to you at this time or at your current location."

In the above example, the user is prevented from displaying the credential on the user's client device when one or more conditions on the operability of the credential are not satisfied. However, the conditions associated with a credential may be enforced in additional or alternative manners as described in more detail below. For example, in some implementations, a user may be able to display a credential regardless of whether the associated conditions are satisfied. However, any attempt to validate the credential when any of the associated conditions are not satisfied will result in a validating device determining that the credential is invalid.

Figure 6:
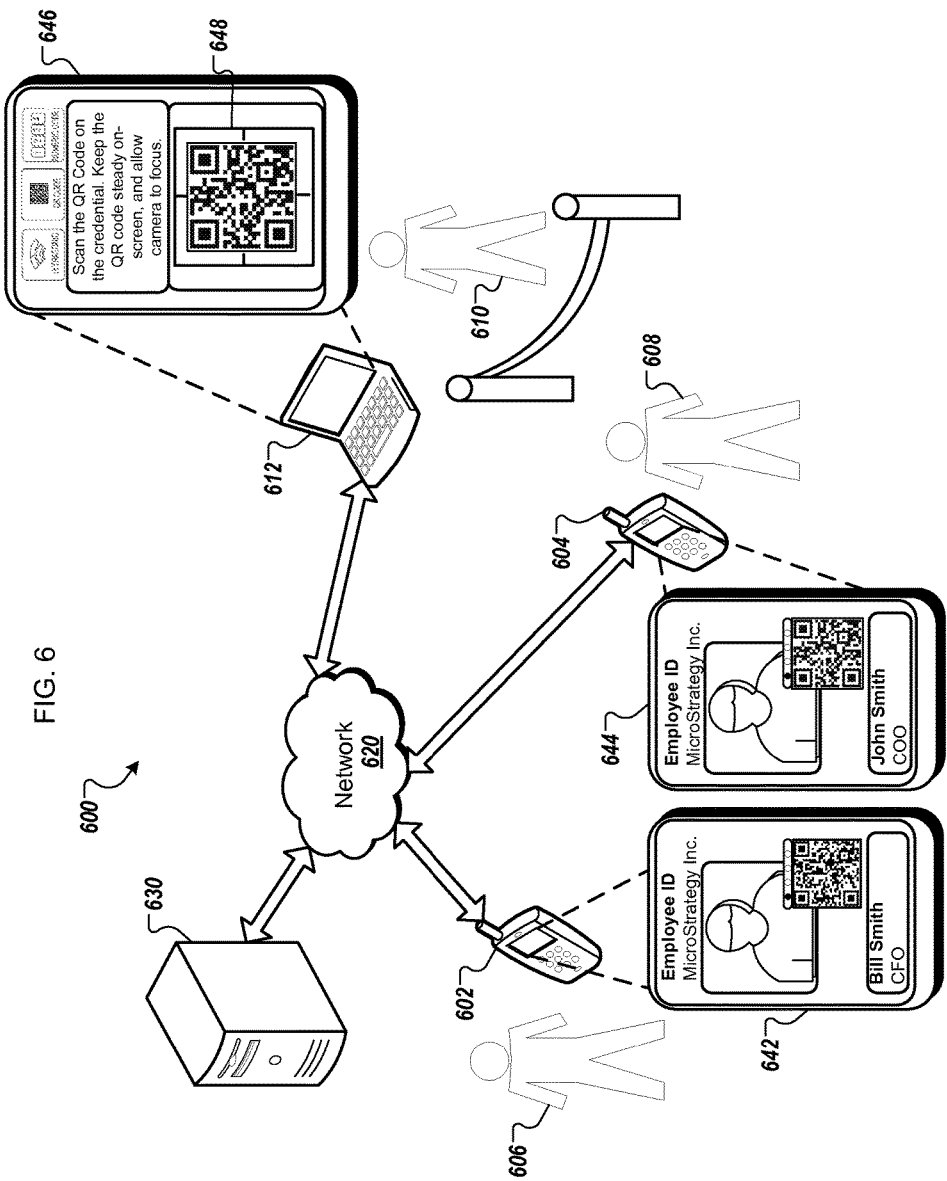
FIG. 6 is a diagram of an example system for management, distribution, and validation of user credentials.

FIG. 6 shows an example system 600 for management, distribution, and validation of conditional user credentials. As an overview, a server 630 communicates via a network 620 with client devices 602, 604 operated by users 606, 608. The server 630 also communicates via network 620 with a processing system 612 operated by a validation entity 610. The validation entity 610 operates the processing system 612 to validate conditional credentials presented by the users 606, 608 on their client devices 602, 604 by communicating with the server 630 as described below.

In operation, the server 630 manages and/or stores one or more credentials, associates users and groups of users with appropriate credentials, and provides the credentials to users' client devices and/or processing systems (e.g., operated by credential authorities) for validation. The server 630 can be any suitable computer or collection of computers executing software capable of managing, distributing, and/or validating representations of credentials for users and groups of users via a network 620 as described herein.

Credentials, user accounts, group accounts, and administrative accounts can be stored in a database (e.g., MySQL, PostgreSQL, MS SQL Server, MongoDB), or other suitable data structure that can be accessed by the server 630. In some implementations, the server 630 may access the stored credentials and/or user accounts via web services such as representational state transfer (REST) style services.

As an initial step, the server 630 creates a credential based on input provided by a credential grantor (e.g., an employer). The credential may include a variety of information such as a credential identifier (e.g., a number or alphanumeric character string that uniquely identifies a credential), a description of an event or location, one or more conditions such as a temporal and/or a geographic condition, and one or more designated validation entities.

The server 630 may present a suitable interface to the credential grantor for creation of credentials. For example, the server 630 may present a web interface through which grantors can interact via a Web browser. In other aspects, the server 630 may be directly accessible via a graphical-user interface or an application running on a mobile device. Any suitable interface can be used that enables the creation and storage of credentials, and user accounts. In addition (or as an alternative) to creation of credentials by credential grantors, credentials could be created at the request of registered users through a web-based or other interface, or through any other suitable mechanism such as sending email or short message service (SMS) transmissions to grantors. In some implementations, registered users may be able to create credentials by use of an application running on a client device.

The interface for the creation of credentials may provide a credential grantor the ability to associate conditions with the credentials. For example, the interface may show a hierarchical menu of potential conditions such as time and location, and allow the credential grantor to identify desired conditions.

In some implementations, a credential grantor may associate a credential with a temporal condition. A temporal condition may identify, for example, a time period or multiple time periods during which the credential is operational. The time periods may be identified using any suitable format, such as, for example, by a specific date or range of dates and times (e.g., Dec. 25, 2012 from 9:00 am to 5:00 pm or Dec. 15, 2012 at 9:00 am to Dec. 31, 2012 at 5:00 pm), an expiration date and time (e.g., before Dec. 31, 2012 at 12:00 am), or a recurring day and time (e.g., every Monday through Friday from 9:00 am to 5:00 pm). The time periods may be stored in any suitable format. For example, a specific date or range of dates and times may include: a pair of dates plus times, a starting date and time plus a duration, or a pair of times since epoch. An expiration date and time could be identified by a date and time or a time since epoch. A recurring day and time could be represented as days of the week (e.g., in cron format with Sunday-Saturday represented by integers 0-6) and times (e.g., in 12 hour format such as 9:00 am to 5:00 pm or in 24 hour format such as 0900 to 1700).

In some implementations, the temporal condition could be stored as any suitable data object, such as, for example, an eXtensible Markup Language (XML) or JavaScript Object Notation (JSON) object. An example JSON object for a temporal condition corresponding to an expiration date of Dec. 31, 2012 at 12:00 am, and a valid weekly time period of every Monday to Friday from 0500 to 1300, and every Saturday and Sunday from 0600 to 0800 is shown below:

"time_condition": {
  "expiration_date": "2012-12-31 00:00:00",
  "weekly": [{"week_days": "1, 2, 3, 4, 5",
    "start_time": "0500",
    "end_time": "1300" },
    {"week_days": "0, 6",
    "start_time": "0600",
    "end_time": "0800" }]}

Alternatively or in addition, a credential grantor may associate a geographic condition with a credential. A geographic condition can identify, for example, one or more locations such as commercial buildings, geographic regions, particular rooms in a building, large venues, private residences, or any other physical spaces. The geographic location or locations may be stored as, for example, points identified by a latitude coordinate and a longitude coordinate (e.g., 38.915530, −77.220604), polygons whose boundaries are defined by a set of latitude/longitude coordinate pairs (e.g., 38.910000, −77.220000; 38.810000, −77.220000; 38.810000, −77.120000; 38.910000, −77.120000), street addresses (e.g., 100 Main Street, Washington, D.C.), etc. In some implementations, the geographic locations may be associated with an indication of a predefined distance from the location (e.g., 1000 yards) that a client device can use to determine whether it has entered or left the location. In other implementations, the geographic location may be associated with indications of two predefined distances (e.g., 500 yards and 1000 yards), so that a client device can use the first distance to determine whether it has entered the location and the second distance to determine whether it has left the location. Depending on the implementation, these two distances may be the same or different. Moreover, the predefined distances may be default distances for all events, default distances for different categories of events, or different for each event (e.g., a predefined distance may be stored with each credential).

In some implementations, the geographic condition could be stored as any suitable data object, such as, for example, an XML or JSON object. An example JSON object for a geographic condition corresponding to approximately a 30 mile radius from Tysons Corner, Va., and approximately a 20 mile radius from Seattle, Wash. is shown below:

"location_condition":
   [{"point": "+38.92, −77.23", "radius": 48000},
    {"point": "+47.61, −122.33", "radius": 32000} ]

Credentials may also be associated with combinations of geographic and temporal conditions. In particular, a credential may be valid during certain time periods at one location and other, different time periods at another location. For example, a credential may be valid every Monday to Friday from 0500 to 1300 within 30 miles of Tyson's Corner, Va., and valid every Saturday and Sunday from 0600 to 0800 within 20 miles of Seattle, Wash.

The server 630 also may present an interface so that users and/or credential grantors can create user accounts for individual users and groups of users. For example, the server 630 may present a web interface through which credential grantors can interact via a Web browser. Additionally or alternatively, the server 630 may be directly accessible via a graphical-user interface or an application on a mobile device. User accounts may be stored in a table or collection of tables in a database, or in any other suitable data structure accessible by the server 630. The user accounts may include a variety of information such as user name, user title, user identifier (e.g., a number or character string that uniquely identifies a user), and/or the address(es) of one or more client devices owned by or otherwise associated with the user. Likewise, group accounts may be stored in a table, collection of tables, or any other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group. In addition (or as an alternative) to creation of user accounts and groups by grantors, user accounts and groups can be created at the request of potential users through a web-based or other interface, or through any other suitable means such as sending email or SMS to grantors. In some implementations, the potential users may be able to create user accounts by use of an application running on a client device.

As an example, Mr. John Smith may request a new user account from the server 630 using an application executing on his client device. The server 630 can then create database entries representing a user account for Mr. Smith. A credential grantor could then create a row in another table for a group identified as employees of Company X. The grantor and/or server 630 could then link the database entry for Mr. Smith to the group account for Company X through use of a linking table.

Once credentials and users, or groups of users, have been created, credential grantors and/or users can associate the credentials with users, or groups of users. For example, the server 630 may present a web interface through which grantors can interact via a Web browser to link a given credential to a given user or group of users. In other aspects, the server 630 may be directly accessible via a graphical-user interface or an application on a mobile device. Credentials may be associated with users, or groups of users, for example, by generating a credential identifier for a given user or group of users, and associating the credential identifier with the user or group of users by storing an entry for the credential identifier as a database entry related to a credential. In addition to association of credentials to users and groups of users by grantors, registered users also may request that certain users, or groups of users, be associated with certain credentials through a web-based or other interface, or through any other suitable means such as sending email or SMS transmissions to grantors. In some implementations, users may be able to associate their user accounts with one or more credentials by use of an application running on a client device. Furthermore, the server 630 also may notify the users that they have been associated with the credential(s), for example by pushing notifications to the respective users' client devices. Such notifications may include the credential identifier and/or a key for the user.

Once credentials have been associated with appropriate user and/or group accounts, the credentials can then be distributed to client devices for the appropriate users via the network 620. For example, the network 620 may be a local area network ("LAN") and a wide area network ("WAN"), e.g., the Internet. In some versions, the server 630 may communicate with the client devices via SMS or multimedia messaging service (MMS). The server 630 may access user accounts in a database to locate the appropriate users' client devices.

Client devices 602, 604 can receive the credentials associated with their respective users 606, 608 and store them in any suitable memory for later retrieval. A given user 606, 608 may be associated with multiple different credentials, with each potentially being subject to different geographic and/or temporal conditions. Some or all of the credentials associated with a user 606, 608 may be accessible on a user's client device 602, 604. In particular, software applications executing on the client devices 602, 604 can then retrieve the credentials so they can be used for generating and presenting a representation of the credential to a validation entity for validation. The client devices 602, 604 may be any type of computing device, including but not limited to a mobile phone, smart phone, PDA, music player, e-book reader, tablet computer, laptop or desktop computer, or other stationary or portable device, that includes one or more processors and non-transitory computer readable storage media. The software application can be written in any suitable programming language such as, for example, Objective-C, C++, Java, etc.

FIG. 6 illustrates an example in which the credentials correspond to employee badges for gaining entry into a place of business. Users 606, 608 are employees and, consequently, have received credentials related to the business. The validation entity 610 is a security guard responsible for permitting only authorized individuals to enter the place of business. The credentials are associated with conditions that govern, for example, where and at what time the credentials may be presented and/or validated. The credential for accessing the place of business may be represented in a variety of different formats described below, and the validation entity 610 may be able to validate representations of the credential in any of these different formats.

The client device 602 of user 606 is executing an application that displays a user interface 642 (similar to the badge 200 shown in FIG. 2) including an optical machine readable representation for the credential (e.g., a QR code). The client device 604 of user 608 is likewise executing an application that displays a user interface 644 including a different QR code. User 608, at the front of the entry line, has presented the QR code for validation to the validation entity 610.

In some implementations, the client device 602, 604 may obtain the user's image from, for example, a memory of the client device 602, 604, or a server such as the server 630. The client device 602, 604 may display this image before, after, and/or during presentation of the optical machine-readable representation for authentication of the user 606, 608.

When a user 606, 608 decides to present a representation of a credential to the validation entity 610 for validation, the user 606, 608 inputs a command into the user's client device 602, 604 via a man-machine interface (e.g., a user interface on a presence-sensitive display). An application executing on the client device 602, 604 then generates and outputs the selected representation.

In some implementations, conditions associated with credentials are enforced locally at the client devices 602, 604. When the user 606, 608 attempts to display a credential, the application identifies any temporal and/or geographic conditions associated with the credential and determines whether the conditions are satisfied based on the current time and/or the current location of the client device 602, 604 before allowing the representation for the credential to be displayed.

The client device 602, 604 may obtain a current time derived from a timing device of the client device. The time can be, for example, a current timestamp (e.g., seconds or milliseconds from epoch) obtained from a timing device such as a hardware or software clock located at the client device. Alternatively or in addition, when the client device 602, 604 has network connectivity, the application may poll another network device (e.g., a network time server) to determine the current time instead of relying on the time indicated by the client device 602, 604. Relying on the network device may be advantageous, for example, because a user may manipulate the time on the client device to circumvent temporal conditions associated with a credential.

The client device 602, 604 can then compare the current time with any temporal conditions associated with the credential. For example, assume that the credential is associated with a temporal condition so that it is only operational before Dec. 31, 2012 at 12:00 am. If the current date and time at the client device is Jan. 30, 2013, 3:00 pm, then when the user attempts to present the credential, the client device 602, 604 denies the request and instead displays a message such as the alert 500 of FIG. 5.

To determine the current location, the client device 602, 604 may use GPS coordinates. Alternatively or in addition, the client device 602, 604 may determine location using Wi-Fi access point triangulation data, cellular network triangulation data, or IP address information when the client device has network connectivity.

The client device 602, 604 can then compare the current location with any geographic conditions associated with the credential. For example, assume that the credential is associated with a location condition that requires the user's client device to be within 30 miles of Tyson's Corner, Va. If the user's client device is greater than 30 miles from Tyson's Corner, Va. when the user attempts to present the credential, the client device 602, 604 denies the request and instead displays a message such as the alert 300 of FIG. 3.

In some implementations, the logic for enforcing conditions associated with a credential may reside on the server 630, and the application executing on client devices 602, 604 may request permission from the server 630 prior to outputting a representation for a credential. In such implementations, the client device 602, 604 may first determine whether it currently has network connectivity as a prerequisite to outputting a representation for the credential.

For example, if a credential has an associated temporal condition, the server 630 may access a current time from a timing device accessible to the server 630 (e.g., a local clock or network time server) when it receives a request from a client device 602, 604 to output a representation for a credential. The server 630 may then deny the request to output the representation if the current time determined at the server 630 does not satisfy the temporal condition.

If a credential has an associated geographic condition, the server 630 may receive location information from the client device 602, 604 as part of the request, and then determine whether the geographic condition is satisfied based on the location information received with the request. Alternatively or in addition, the server 630 may require that the client device 602, 604 be connected to a particular network (e.g., a specific Wi-Fi network or cellular base station) that is associated with the geographic location at which the credential is valid. In other implementations, the processing system 612 may send its location information to the server 630 as part of the request (alternatively or in addition to location information obtained from the client device 602, 604), and then determine whether the geographic condition is satisfied based on the location information received from the processing system 612. The server 630 may deny the request to output the representation if the obtained location information does not satisfy the geographic condition.

Alternatively or in addition, conditions associated with credentials may not be enforced when a user attempts to output a representation for a credential, but rather when the user attempts to validate a credential. In other words, the client device 602, 604 may be able to present a representation for a credential regardless of any conditions, but the server 630 will identify credentials that do not satisfy any associated conditions as being invalid. In addition, the server 630 may transmit a message to one or more client devices associated with a user to notify the user of the reason or reasons for which the credential was rejected. Advantageously, enforcing conditions in this manner may aid in enforcing the conditions even if a user 606, 608 has manipulated their client device 602, 604 to circumvent the conditions associated with the credential (e.g., by manipulating a local clock on a client device and/or manipulating location services provided by a client device).

In such implementations, when the processing system 612 transmits the validation request to the server 630, the processing system 612 may include an indication of a location of the processing system 612 at which the representation was presented for validation along with the validation request. The server 630 may then compare the location information provided by the processing system 612 with the geographic conditions associated with the credential to determine whether the geographic conditions are satisfied. In some implementations, the server 630 may confirm that location information from the processing system 612 is consistent with location information received from the client device 602, 604 to identify any potential manipulations by a user.

Alternatively or in addition, the server 630 may enforce any temporal conditions associated with a credential by determining the time at which a validation request was received based on a local clock or network time server. The server 630 may then compare the time at which the validation request was received and compare it with the temporal conditions associated with the credential. In some implementations, the server 630 may confirm that a time from the client device 602, 604 is consistent with the current time obtained at the server 630 to identify any potential manipulations by a user.

In some implementations, the client device 602, 604 and/or server 630 may monitor conditions associated with a given credential and alert users associated with that credential that a condition associated with the credential is (or is about to be) violated. For example, the client device 602, 604 may notify a user 606, 608 that a time period during which a credential is valid is about to expire or has expired. In particular, a credential management application on the client device 602, 604 could register a callback function that notifies the application when any time condition associated with a credential stored by the application has expired or is about to expire.

Alternatively or in addition, the client device 602, 604 may notify a user 606, 608 that the user is close to leaving or has left a location at which the credential is valid. For example, the credential may be associated with a geofence. As described herein, a geofence may be a virtual perimeter for a real-world geographic region. Applications can generate geofences so as to be notified when the user crosses geographic boundaries. For example, this capability can generate alerts when a user gets close to a specific location, leaves a specific location, and/or crosses a region boundary. In some cases, regions associated with an application are continuously tracked. If a region boundary is crossed while an application is not running, that application may be relaunched into the background to handle the event. Similarly, if the application is suspended when the event occurs, it may be woken up and given a short amount of time to handle the event. Geofences may be, for example, dynamically generated, such as in a radius around a venue or point location, or could include a predefined set of boundaries, such as streets around a venue, neighborhood boundaries, state or country boundaries, etc.

When the conditions associated with a credential are satisfied, the client device 602, 604 may output a representation for the credential. The representation of a credential may take a variety of different forms. For example, the representation may be an alphanumeric code, a sound signal, an optical machine-readable representation (e.g., a barcode or a quick response (QR) code), a parametrically-generated graphical representation, an animated graphic representation, and/or a phrase.

As referred to herein, an alphanumeric code may be a sequence of numbers and/or letters (e.g., 4 to 24 characters) that is associated with a credential and a user. In some instances, a given numeric representation will only be valid for a certain time period. In operation, applications for credential validation execute on the client device 602, 604 and the processing system 612. The server 630 associates an alphanumeric code with a user 606, 608 and a credential, and distributes the alphanumeric code to the user's client device 602, 604. When the user 606 presents the alphanumeric code to the validation entity 610, the processing system 612 can validate the alphanumeric code by communicating with the server 630, and receiving a response indicating whether the presented alphanumeric code matches a valid alphanumeric code (e.g., an alphanumeric code that currently is associated with a user to whom a valid credential has been granted at the point in time the processing system 612 communicates the alphanumeric code to the server 630).

As referred to herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations. The optical machine-readable representations may encode data including or representing credential identifiers and any other suitable data. In other implementations, the optical machine-readable representations may encode other identifiers that are linked to or otherwise associated with credential identifiers. As an example, credential identifiers for the users 606, 608 may be encoded using QR codes.

The client device 602, 604 may use any suitable technique for encoding the optical machine-readable representation. For example, the client device may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification.

When the client device 602, 604 displays an optical machine-readable representation, the validation entity 610 can operate the processing system 612 to scan the portion of the client device's display showing the representation and decode the representation to generate a set of alphanumeric characters that were encoded in the representation. In particular, the processing system 612 may output a reticle defining a field of view from a camera operatively coupled to the processing system 612. This reticle can be used by the validation entity 610 to scan the optical machine-readable representation from the relevant portion of the client device's display 644.

The processing system 612 may use any suitable mechanism to scan and decode the optical machine-readable representation. For example, the processing system 612 may access a function or library routine that captures and decodes QR codes and/or barcodes using a camera operatively coupled to the processing system 612. Suitable libraries may include, for example, RedLaser or Zxing.

The processing system 612 can then validate the optical machine-readable representation by communicating data corresponding to the alphanumeric characters that were encoded in the representation to the server 630. In response, the processing system 612 receives a response indicating whether the presented optical machine-readable representation corresponds to a credential that currently is associated with a user to whom a valid credential has been granted at the point in time the processing system 612 communicates the alphanumeric code to the server 630.

As described herein, a sound signal is an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz. Additionally or alternatively, the sound signal may be in the ultrasonic frequency range, e.g., about 20 kHz or more.

The sound signal may encode data including or representing credential identifiers and any other suitable data. In other implementations, the sound signal may encode other identifiers that are linked to or otherwise associated with credential identifiers. As an example, credential identifiers for the users 606, 608 may be encoded using sound signals. The client device may use any suitable technique for encoding the sound signal. For example, the client device may call a function or library routine that encodes data into sound signals such as the Zoosh SDK by Naratte, Inc. The client device 602, 604 can then output the sound signal from a speaker coupled to the client device for reception by the processing system 612.

When the client device 602, 604 outputs a sound signal, the validation entity 610 can operate the processing system 612 to receive the sound signal at a speaker of the processing system and decode the sound signal to generate a set of alphanumeric characters that were encoded in the sound signal. The processing system 612 may use any suitable mechanism to receive and decode the sound signal. The processing system 612 can then validate the alphanumeric characters by communicating with the server 630. In response, the processing system 612 receives a response indicating whether the alphanumeric characters encoded in the sound signal correspond to a credential that is currently is associated with a user to whom a valid credential has been granted at the point in time the processing system 612 communicates the alphanumeric characters to the server 630.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 602, 604 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 612 obtains a credential identifier and a time, and generates a parametrically generated graphical representation for the credential in the same manner. When the timing device at the processing system 612 is synchronized with the timing devices at client device 602, 604, the parameters generated at the processing system 612 should be identical (or nearly identical) to those of the client device 602, 604 when the credential identifiers are the same. The graphical representation generated by processing system 612 should therefore match the graphical representations on the client device 602, 604 allowing the validation entity 610 to visually validate the credential on the client device 602, 604.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 602, 604 may access the stored graphical representations by way of index values, where an index value may correspond to a single representation. In operation, a client device 602, 604 obtains a credential identifier (e.g., from a memory of the client device) and a time (e.g., from a timing device of the client device), and selects an animated graphical representation for the credential by using the credential identifier and the time to generate an index value. Similarly, for validation, the processing system 612 obtains a credential identifier and a time, and selects an animated graphical representation for the credential in the same manner. When the timing device at the processing system 612 is synchronized with the timing device at client device 602, 604 the index values generated at the processing system 612 should be substantially identical to those of the client device 602, 604 when the credential identifiers are the same. The graphical representation selected by processing system 612 should therefore match (or nearly match) the graphical representations on the client devices 602, 604 allowing the validation entity 610 to visually validate the credential on the client device 602, 604.

As referred to herein, a phrase may be a sequence of two or more words selected from one or more dictionaries of words that need not form a grammatical construct. A dictionary as used herein is a data structure in which index values identify words. A given dictionary may include many thousands of different words. In operation, applications for credential validation executing on the client device 602, 604 and the processing system 612 can access a common set of dictionaries for generating phrases, so that when the applications reference the same index values in the same dictionaries, at substantially the same time, they can select the same phrases. Thus, the processing system 612 displays the same phrase as the client devices 602, 604 which enables the validation entity 610 to validate the phrases at the client device 602, 604.

When the server 630 receives a validation request message from the processing system 612, it attempts to confirm that the presented representation of the credential is valid. In particular, the server 630 may decode a set of alphanumeric characters and/or parse an alphanumeric code to obtain the credential identifier. The server 630 can then access the corresponding credential using the credential identifier (e.g., from a database by querying using the credential identifier). Upon retrieving the credential, the server 630 can determine whether the presented representation for the credential was valid by comparing data received in the validation request message with data associated with the retrieved credential. For example, the server 630 may determine that a user identifier included in the validation request corresponds to an authorized user of the credential. In some implementations, the processing system 612 may perform some or all of the validation of the representations for the credential.

In some implementations, if the credential representation is validated, the validation response may include an image, a name, and/or other data relating to the validated user including, e.g., a copy of the user's credential. The server 630 may obtain information relating to the user (e.g., an image of the user) from the credential grantor as described above. For example, the processing system 612 may display the user's name and the user's image as shown in FIG. 6. In some implementations, responsive to receiving a validation response from the server 630, the processing system 612 may obtain the user's image from, for example, a memory of the processing system 612, the server 630, a server made accessible by the credential grantor, or another server. The processing system 612 may then output the user's image to a display operatively coupled to the processing system 612.

Upon successful validation, the server 630 sends the processing system 612 a validation response indicating that the representation for the credential was valid (e.g., the set of alphanumeric characters decoded from the representation matches a set of alphanumeric characters generated at the server 630). The processing system 612 may then provide an indication to the validation entity 610 that the representation presented by the user 608 was valid. The validation entity 610 may then permit the user 608 to enter the place of business.

While shown in FIG. 6 as a person, the validation entity 610 can be any agent capable of validating representations of credentials presented by users. As an example, the validation entity 610 could be a software application executing on the processing system 612 that processes a representation for a credential received from a client device 602, 604, decodes the representation to generate an alphanumeric set of characters, transmits the alphanumeric set of characters to the server 630, and receives a response from the server 630 indicating that the representation is valid. The software application could then control an automated gate to permit user 608 to enter. The processing system 612 can also be any suitable computer or set of computers capable of communicating with the server 630 via network 620, such as a mobile phone, smart phone, PDA, tablet computer, laptop or desktop computer, or other stationary or portable device, that includes one or more processors and non-transitory computer readable media.

Representations for multiple credentials may be displayed and/or presented concurrently. This may be implemented, for example, when credentials represent a hierarchy of access. As an example, if Mr. John Smith is an employee of MicroStrategy Incorporated and also is authorized to access the Executive Suite of MicroStrategy's headquarters, he may have two credentials, i.e., a first credential identifying Mr. Smith as an employee who is authorized to enter the headquarters, and a second authorizing Mr. Smith to access the Executive Suite. In such implementations, representations for the first credential and the second credential may both be presented at the same time or in series so that a validation entity can permit Mr. Smith access to the Executive Suite.

Figure 7:
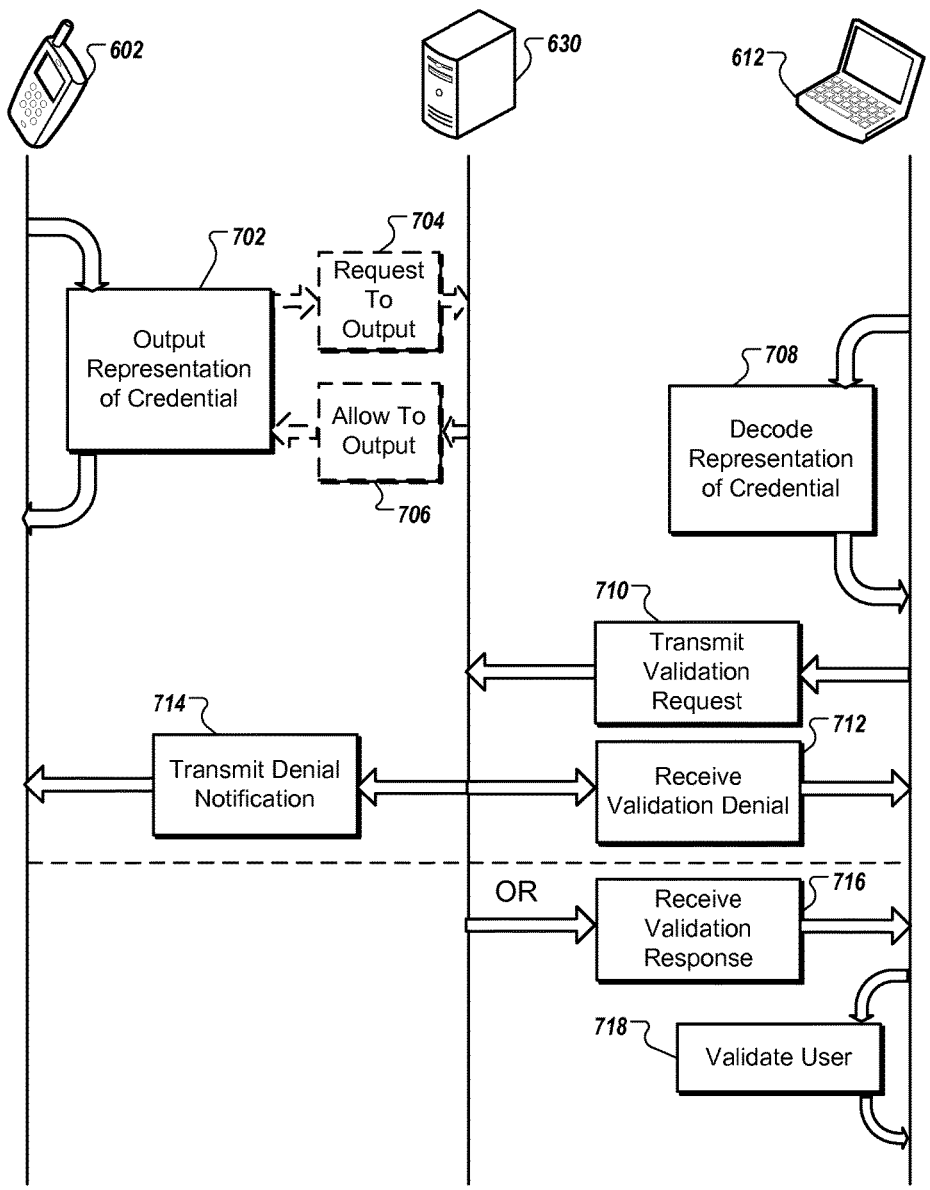
FIG. 7 is a messaging diagram that illustrates examples of messages between a client device, server, and processing system in a system for management, distribution, and validation of user credentials.

FIG. 7 shows sample messages between a client device 602, server 630, and processing system 612 in a system for management, distribution, and validation of user credentials. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, in step 702, a user 606 operates a client device 602 to attempt to output a representation for a credential to a processing system 612 operated by a validation entity 610. As discussed above, the client device 602 may determine whether any conditions associated with the credential are satisfied and allow the request if such conditions are satisfied or deny the request if such conditions are not satisfied. Moreover, the client device 602 may optionally send a message 704 to the server 630 requesting permission to output the representation for the credential. The server 630 may determine whether conditions associated with the credential are satisfied and then respond with a message 706 allowing (or not allowing) the client device 602, 604 to output the representation depending on whether the conditions are satisfied.

In step 708, the processing system 612 obtains a representation for the credential from the client device 602 (e.g., scans a QR code or receives a sound signal) and decodes the representation for the credential. The processing system 612 then transmits a validation request message 710 to the server 630. The server 630 processes the information in the validation request message and determines whether the representation for the credential presented by the client device 602 is valid.

If the server 630 determines that the credential is not valid (e.g., one or more conditions are not satisfied), then the server 630 transmits a message 714 to the client device 602 notifying the user 606 that the credential was rejected and informing the user of the reason or reasons for the rejection. The server 630 also sends a validation denial message 712 to the processing system 612 indicating that the credential was not valid. The validation denial message 712 may also include the reason or reasons for the rejection.

If, on the other hand, the server 630 determines that the credential is valid, then the server 630 sends a validation response message 716 to the processing system 612 indicating that the credential has been validated. Then, in step 718, the processing system 612 validates the credential.

Figure 8:
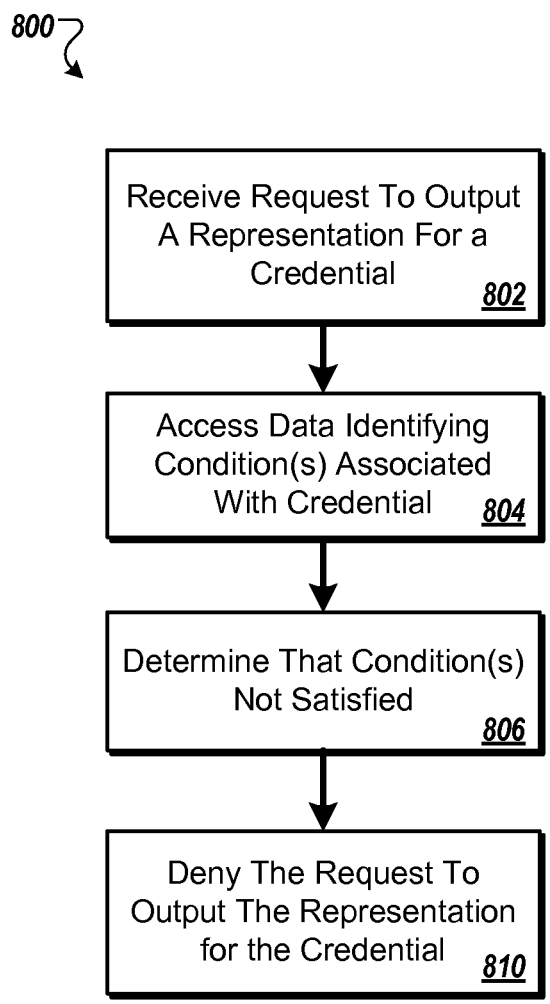
FIG. 8 is a flowchart of an example process for enforcing conditions on the operation of a conditional user credential.

FIG. 8 shows example process 800 for enforcing conditions on the operation of a conditional user credential. In step 802, a processing system (e.g., a client device 602, 604 or a server 630) receives a request from a user 606, 608 to output a representation for a credential at a client device 602, 604. For example, the user 606, 608 may input a command to output a representation for a credential, or a client device 602, 604 may transmit a message to the server 630 requesting permission to output a representation for a credential. The credential is associated with the user, e.g., an account associated with the user is linked to an entry corresponding to the credential in a database.

The representation for the credential may be, for example, a parametrically-generated graphical representation, an animated graphical representation, a phrase, an alphanumeric code, a sound signal, and/or an optical machine-readable representation.

In response to receiving the request from the user to output the representation for the credential, in step 804, the processing system accesses data identifying one or more conditions associated with the credential. For example, the client device 602, 604 may retrieve conditions associated with the credential from a local memory, or the server 630 may retrieve conditions associated with the credential from a database.

The conditions may be, for example, geographic and/or temporal conditions. Temporal conditions may identify one or more periods of time during which the credential is valid. Geographic conditions may identify one or more geographic regions or locations at which the credential is valid.

Next, in step 806, the processing system determines that at least one of the one or more conditions associated with the credential is not satisfied. For example, the client device 602, 604 or the server 630 may analyze the conditions and determine if they are satisfied.

For a temporal condition, the processing system may determine a current time (e.g., a local timing device or network time from a server accessed by the client device 602, 604 or the server 630). The processing system can then compare the current time with the temporal conditions associated with the credential to determine that the current time is not within a period of time during which the credential is valid.

For a geographic condition, the processing system may determine that the current location of the client device 602, 604 is outside of the geographic region or location at which the credential is valid. For example, the client device 602, 604 may determine its current location based on GPS coordinates, Wi-Fi access point triangulation data, cellular network triangulation data, or IP address information. Alternatively or in addition, the client device 602, 604 may transmit its current location to the server 630. In some implementations, the processing system 612 associated with the validation entity 610 may transmit its current location based on GPS coordinates, Wi-Fi access point triangulation data, cellular network triangulation data, or IP address information to the server 630, which can use the information to infer the location of the client device 602, 604.

In response to determining that the at least one of the one or more conditions associated with the credential is not satisfied, in step 810, the processing system denies the request from the user to output the representation for the credential at the client device 602, 604. For example, the client device 602, 604 may output a message to the user indicating that one or more of the conditions is not satisfied (e.g., that the credential is not available at the current time and/or location), or the server 630 may transmit a message to the client device indicating that the credential may not be outputted. The processing system may then prevent a representation for the credential from being outputted at the client device.

In some implementations, the processing system receives requests to output representations for multiple different credentials at a client device 602, 604. In such implementations, one or more of the credentials may have conditions associated with them that are not satisfied. For example, the processing system may receive a first request to output a first credential having one or more associated conditions (e.g., temporal and/or geographic conditions) that are not satisfied. The processing system may therefore deny the first request. The processing system may then receive a second request to output a second credential having different conditions (e.g., temporal and/or geographic conditions) than the first credential. The processing system may determine that the conditions associated with the second credential are satisfied, and therefore allow the client device 602, 604 to output the representation for the second credential.

In some implementations, the processing system (e.g., the client device 602, 604 and/or the server 630) may monitor conditions associated with credentials and notify the user when conditions are about to be violated. For example, the processing system may determine that a current time is within a predetermined amount of time of an end of the period of time during which the second credential is valid and output a message to the user indicating that the second credential has expired or is about to expire. Alternatively or in addition, the processing system may determine that a current location of the client device 602, 604 is within a predetermined distance of a boundary of the geographic region at which the second credential is valid, and then output a message to the user indicating that the user is about to leave or has left the geographic region at which the second credential is valid.

Figure 9:
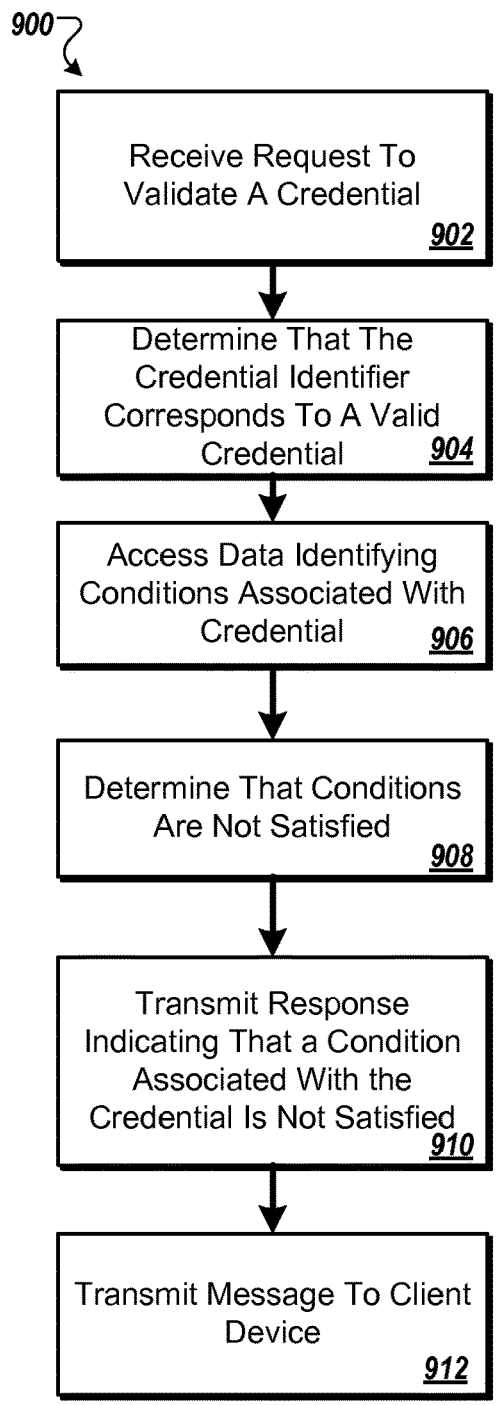
FIG. 9 is a flowchart of an example process for validating a user credential at a server.

FIG. 9 shows an example process 900 for validating a conditional user credential at a server. In step 902, the server 630 receives a request to validate a credential from a processing system 612, where the request includes a credential identifier that identifies a credential. The request may also include an indication of a current location of the client device 602, 604 that outputted the representation for the credential (e.g., GPS coordinates, Wi-Fi access point triangulation data, cellular network triangulation data, or IP address information) and/or an indication of a current location of the processing system 612 (e.g., GPS coordinates, Wi-Fi access point triangulation data, cellular network triangulation data, or IP address information).

Next, in step 904, the server 630 determines that the credential identifier is associated with a valid credential (e.g., that the credential is stored in the database and/or that the credential is associated with a user identifier corresponding to the client device 602, 604 that outputted the representation for the credential being validated).

In step 906, the server 630 accesses data identifying one or more conditions associated with the credential using the credential identifier (e.g., querying a database using the credential identifier). The conditions may be temporal and/or geographic conditions. A temporal condition may identify one or more periods of time during which the credential is valid. A geographic condition may identify one or more geographic regions at which the credential is valid.

Then, in step 908, the server 630 determines that at least one of the one or more conditions associated with the credential is not satisfied. For a temporal condition, the server 630 may determine that a current time derived from a timing device accessible by the server is not within the period of time during which the credential is valid. For a geographic condition, the server 630 may determine that the client device 602, 604 is outside a geographic region where the credential is valid.

In step 910, in response to determining that at least one of the one or more conditions associated with the credential is not satisfied, the server transmits a response to the processing system 612 indicating that a condition associated with the credential is not satisfied. Finally, in step 912, the server 630 transmits a message indicating that a condition associated with the credential is not satisfied to the client device 602, 604 associated with the credential identifier. In some implementations, the transmitted message may explicitly identify the one or more conditions that server 630 determined not to be satisfied.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more computers which, upon such execution, cause the one or more computers to perform operations comprising:
   receiving, at a processing system, a request from a user to output a representation for a credential at a client device, the credential being associated with the user;
   in response to receiving the request from the user to output the representation for the credential, accessing, at the processing system, data identifying one or more conditions associated with the credential;
   determining, at the processing system, that at least one of the one or more conditions associated with the credential is not satisfied; and
   in response to determining that the at least one of the one or more conditions associated with the credential is not satisfied, denying the request from the user to output the representation for the credential at the client device.

2. The computer-readable medium of claim 1, further comprising determining, at the processing system, that the credential has not expired;
   wherein accessing, at the processing system, data identifying one or more conditions associated with the credential comprises accessing, at the processing system, data identifying a period of time during which the credential is valid;
   wherein determining, at the processing system, that at least one of the one or more conditions associated with the credential is not satisfied comprises determining, at the processing system and in response to determining that the credential has not expired, that a current time is not within the period of time during which the credential is valid; and
   wherein, in response to determining that at least one the one or more conditions associated with the credential is not satisfied, denying the request to output the representation for the credential at the processing system comprises, in response to determining that the current time is not within the period of time during which the credential is valid, denying the request to output the representation for the credential at the client device.

3. The computer-readable medium of claim 2, wherein determining, at the processing system, that a current time is not within the period of time during which the credential is valid comprises:
   obtaining, at the processing system, a time from a server via a network; and
   determining, at the processing system, that the time from the server is not within the time period during which the credential is valid.

4. The computer-readable medium of claim 2, wherein determining, at the processing system, that a current time is not within the period of time during which the credential is valid comprises:
   obtaining, at the processing system, a time from a timing device at the processing system; and
   determining, at the processing system, that the time from the timing device is not within the time period during which the credential is valid.

5. The computer-readable medium of claim 1,
   wherein accessing, at the processing system, data identifying one or more conditions associated with the credential comprises accessing, at the processing system, data identifying a geographic region at which the credential is valid;
   wherein determining, at the processing system, that at least one of the one or more conditions associated with the credential is not satisfied comprises determining, at the processing system, that a current location of the client device is outside the geographic region at which the credential is valid; and
   wherein, in response to determining that at least one of the one or more conditions associated with the credential is not satisfied, denying the request to output the representation for the credential at the client device comprises, in response to determining that the current location of the client device is outside the geographic region at which the credential is valid, denying the request to output the representation for the credential at the client device.

6. The computer-readable medium of claim 1,
wherein accessing, at the processing system, data identifying one or more conditions associated with the credential comprises accessing, at the processing system, data identifying a geographic region at which the credential is valid and data identifying a period of time during which the credential is valid;
wherein determining, at the processing system, that at least one of the one or more conditions associated with the credential is not satisfied comprises determining, at the processing system, that a current location of the client device is outside the geographic region at which the credential is valid and that a current time prior to expiration of the credential is not within the period of time during which the credential is valid; and
wherein, in response to determining that at least one of the one or more conditions associated with the credential is not satisfied, denying the request to output the representation for the credential at the client device comprises, in response to determining that the current location of the client device is outside the geographic region at which the credential is valid and that the current time prior to the expiration of the credential is not within the period of time during which the credential is valid, denying the request to output the representation for the credential at the client device.

7. The computer-readable medium of claim 1,
wherein receiving, at a processing system, a request from a user to output a representation for a credential at a client device comprises receiving, at a processing system, a first request from the user to output a representation for a first credential at the client device;
wherein, in response to receiving the request from the user to output the representation for the credential, accessing, at the processing system, data identifying one or more conditions associated with the credential comprises, in response to receiving the first request from the user to output the representation for the first credential, accessing, at the processing system, data identifying a geographic region at which the first credential is valid or data identifying one or more conditions associated with the first credential;
wherein determining, at the processing system, that at least one of the one or more conditions associated with the credential is not satisfied comprises determining, at the processing system, that at least one of the one or more conditions associated with the first credential is not satisfied; and
wherein, in response to determining that at least one of the one or more conditions associated with the credential is not satisfied, denying the request to output the representation for the credential at the client device comprises, in response to determining that at least one of the one or more conditions associated with the first credential is not satisfied, denying the request to output the representation for the first credential at the client device; and
wherein the operations further comprise:
receiving, at the processing system, a second request from the user to output a representation for a second credential at the client device, the second credential being associated with the user;
in response to receiving the second request from the user to output the representation for the second credential, accessing, at the processing system, data identifying one or more conditions associated with the second credential, the one or more conditions associated with the second credential being different than the one or more conditions associated with the first credential;
determining, at the processing system, that the one or more conditions associated with the second credential are satisfied; and
in response to determining that the one or more conditions associated with the second credential are satisfied, allowing the representation for the second credential to be outputted at the client device.

8. The computer-readable medium of claim 7,
wherein accessing, at the processing system, data identifying one or more conditions associated with the second credential comprises accessing, at the processing system, data identifying a period of time during which the second credential is valid;
wherein, after allowing the representation for the second credential to be outputted at the client device, the operations further comprise:
determining, at the processing system, that a current time is within a predetermined amount of time of an end of the period of time during which the second credential is valid; and
outputting, from the processing system, a message to the user indicating that the second credential has expired or is about to expire.

9. The computer-readable medium of claim 7,
wherein accessing, at the processing system, data identifying one or more conditions associated with the second credential comprises accessing, at the processing system, data identifying a geographic region at which the second credential is valid;
wherein, after allowing the representation for the second credential to be outputted at the client device, the operations further comprise:
determining, at the processing system, that a current location of the client device is within a predetermined distance of a boundary of the geographic region at which the second credential is valid; and
outputting, from the processing system, a message to the user indicating that the user is about to leave or has left the geographic region at which the second credential is valid.

10. The computer-readable medium of claim 7,
wherein accessing, at the processing system, data identifying one or more conditions associated with the second credential comprises accessing, at the processing system, data identifying a geographic region at which the second credential is valid;
wherein, after allowing the representation for the second credential to be outputted at the client device, the operations further comprise:
determining, at the processing system, that a current location of the client device is within a predetermined distance of a boundary of the geographic region at which the second credential is valid; and
outputting, before the client device has left the geographic region, a message to the user indicating that the user is about to leave the geographic region at which the second credential is valid.

11. The computer-readable medium of claim 1, wherein denying the request from the user to output the representation for the credential at the processing system comprises:
outputting, at the client device, a message to the user indicating that at least one of the one or more conditions is not satisfied and identifying the at least one of the one or more conditions that is not satisfied; and preventing a representation for the credential from being outputted at the client device.

12. The computer-readable medium of claim 1, wherein the operations further comprise storing, in a database, credential data indicating (i) multiple credentials, (ii) expiration times corresponding to the multiple credentials, and (iii) conditions corresponding to the multiple credentials that restrict times or locations that the multiple credentials can be used prior to the expiration times of the multiple credentials, the credential data indicating different conditions for at least some of the multiple credentials;
   wherein receiving the request to output the representation for the credential at the client device comprises receiving a request to output a representation for particular credential that was granted to a particular user; and
   wherein accessing the data identifying one or more conditions associated with the credential comprises accessing, by the processing system and from the database, portions of the stored credential data that indicate one or more conditions that restrict times or locations that the particular credential can be used prior to the expiration time for the particular credential.

13. The computer-readable medium of claim 1, wherein receiving the request to output the representation for the credential at the client device comprises receiving a request to output a machine-readable optical representation that encodes a credential identifier that demonstrates possession of the credential.

14. A computer-implemented method comprising:
   receiving, at a client device, user input indicating a request from a user to output a representation for a credential at the client device, the credential being associated with the user;
   in response to receiving the request from the user to output the representation for the credential, accessing, at the client device, data identifying one or more conditions associated with the credential;
   determining, at the client device, that at least one of the one or more conditions associated with the credential is not satisfied; and
   in response to determining that the at least one of the one or more conditions associated with the credential is not satisfied, denying, at the client device, the request from the user to output the representation for the credential at the client device.

15. The method of claim 14,
   wherein accessing data identifying one or more conditions associated with the credential comprises accessing, at the processing system, data identifying a range of time during which the credential is valid on a particular day that is prior to an expiration date of the credential, the range of time includes less than all of the particular day;
   wherein determining that at least one of the one or more conditions associated with the credential is not satisfied comprises determining, at the processing system, that a current time on the particular day is not within the range of time on the particular day; and
   wherein, in response to determining that at least one the one or more conditions associated with the credential is not satisfied, denying the request to output the representation for the credential comprises, in response to determining that the current time on the particular day is not within the range of time on the particular day, denying the request to output the representation for the credential at the client device.

16. The method of claim 14,
   wherein accessing data identifying one or more conditions associated with the credential comprises accessing, at the processing system, data identifying a particular building or particular room at which the credential is valid;
   wherein determining that at least one of the one or more conditions associated with the credential is not satisfied comprises determining, at the client device, that a current location of the client device is outside the particular building or particular room at which the credential is valid; and
   wherein, in response to determining that at least one of the one or more conditions associated with the credential is not satisfied, denying the request to output the representation for the credential at the client device comprises, in response to determining that the current location of the client device is outside the particular building or particular room at which the credential is valid, denying the request to output the representation for the credential at the client device.

17. The method of claim 14, wherein receiving the user input comprises receiving, at the client device, user input that initiates a request to output, on a display of the client device, of a visual representation that demonstrates that the user has been issued the credential;
   wherein accessing data identifying one or more conditions associated with the credential comprises accessing, at the client device, (i) expiration data indicating an expiration time for the credential, and (ii) additional data indicating one or more additional conditions that limit times or locations that the credential can be used prior to the expiration time;
   wherein determining that at least one of the one or more conditions associated with the credential is not satisfied comprises:
      before the expiration time, determining, at the client device, that at least one of the additional conditions restricts use of the credential at a current time or at a current location of the client device;
   wherein denying the request comprises denying, at the client device, the request from the user to output the visual representation that demonstrates that the user has been issued the credential based on determining that at least one of the additional conditions restricts use of the credential at the current time or at the current location of the client device.

18. The method of claim 14, further comprising displaying, on a display of the client device, a user interface comprising user interface elements corresponding different credentials issued to a user;
   wherein receiving the request comprises receiving user input that selects one of the user interface elements to request output of a representation for the credential corresponding to the selected user interface element.

19. The method of claim 14,
   wherein accessing data identifying one or more conditions associated with the credential comprises accessing data indicating (i) an expiration date for the credential and (ii) a temporal condition that allows use of the credential during particular recurring time periods and restricts use of the credential in other time periods between the recurring time periods;
   wherein determining that at least one of the one or more conditions associated with the credential is not satisfied comprises determining, prior to the expiration date, that a current time is not within one of the recurring time periods; and wherein, in response to determining that at least one the one or more conditions associated with the credential is not satisfied, denying the request to output the representation for the credential at the processing system comprises, in response to determining that the current time is not within the period of time during which the credential is valid, denying the request to output the representation for the credential at the client device.

20. A non-transitory computer-readable medium storing instructions executable by one or more processors which, upon such execution, cause a client device comprising the one or more processors to perform operations comprising:

receiving, at the client device, user input indicating a request from a user to output a representation for a credential at the client device, the credential being associated with the user;

in response to receiving the request from the user to output the representation for the credential, accessing, at the client device, data identifying one or more conditions associated with the credential;

determining, at the client device, that at least one of the one or more conditions associated with the credential is not satisfied; and in response to determining that the at least one of the one or more conditions associated with the credential is not satisfied, denying, at the client device, the request from the user to output the representation for the credential at the client device.

21. A client device comprising:

one or more processors; and one or more machine-readable media storing instructions that, when executed by the one or more processors, cause the client device to perform operations comprising:

receiving, at the client device, user input indicating a request from a user to output a representation for a credential at the client device, the credential being associated with the user;

in response to receiving the request from the user to output the representation for the credential, accessing, at the client device, data identifying one or more conditions associated with the credential;

determining, at the client device, that at least one of the one or more conditions associated with the credential is not satisfied; and in response to determining that the at least one of the one or more conditions associated with the credential is not satisfied, denying, at the client device, the request from the user to output the representation for the credential at the client device.

22. A method comprising:

receiving, at a processing system, a request from a user to output a representation for a credential at a client device, the credential being associated with the user;

in response to receiving the request from the user to output the representation for the credential, accessing, at the processing system, data identifying one or more conditions associated with the credential;

determining, at the processing system, that at least one of the one or more conditions associated with the credential is not satisfied; and in response to determining that the at least one of the one or more conditions associated with the credential is not satisfied, denying the request from the user to output the representation for the credential at the client device.

23. A system comprising:

a processing system comprising one or more computers; and one or more machine-readable media storing instructions that, when executed by the one or more computers of the processing system, cause the processing system to perform operations comprising:

receiving, at the processing system, a request from a user to output a representation for a credential at a client device, the credential being associated with the user;

in response to receiving the request from the user to output the representation for the credential, accessing, at the processing system, data identifying one or more conditions associated with the credential;

determining, at the processing system, that at least one of the one or more conditions associated with the credential is not satisfied; and in response to determining that the at least one of the one or more conditions associated with the credential is not satisfied, denying the request from the user to output the representation for the credential at the client device.

* * * * *

UNITED STATES PATENT AND TRADEMARK OFFICE
CERTIFICATE OF CORRECTION

PATENT NO.       : 10,164,957 B1
APPLICATION NO.  : 13/859862
DATED            : December 25, 2018
INVENTOR(S)      : Michael J. Saylor, Hector Vazquez and Gang Chen Page 1 of 1

It is certified that error appears in the above-identified patent and that said Letters Patent is hereby corrected as shown below:

In the Claims

In Claim 2, Column 20, Line 21, after "one" insert -- of --.

In Claim 15, Column 23, Line 60, after "one" insert -- of --.

In Claim 19, Column 25, Line 4, after "one" insert -- of --.

Signed and Sealed this
Twenty-first Day of January, 2020

Andrei Iancu
*Director of the United States Patent and Trademark Office*